US005623658A

United States Patent [19]

Kiuchi et al.

[11] Patent Number: 5,623,658

[45] Date of Patent: Apr. 22, 1997

[54] DATA TOTALIZING METHOD IN DATA PROCESSING APPARATUS

[75] Inventors: Hiroyoshi Kiuchi, Hachioji; Tosio Touhara, Oome, both of Japan

[73] Assignee: Casio Computer Co., Ltd., Tokyo, Japan

[21] Appl. No.: 416,929

[22] Filed: Apr. 4, 1995

Related U.S. Application Data

[63] Continuation of Ser. No. 219,511, Mar. 29, 1994, abandoned.

[30] Foreign Application Priority Data

Apr. 20, 1993 [JP] Japan .................................... 5-115157

[51] Int. Cl.[6] ............................ G06F 12/08; G06F 17/30

[52] U.S. Cl. .......................... 395/612; 395/300; 395/731; 364/282.1; 364/283.1; 364/283.2; 364/DIG. 1; 364/283.3

[58] Field of Search .................................... 395/600, 300, 395/731; 364/DIG. 1

[56] References Cited

U.S. PATENT DOCUMENTS

| | | | |
|---|---|---|---|
| 4,318,184 | 3/1982 | Millett et al. | 395/600 |
| 4,611,298 | 9/1986 | Schuldt | 395/600 |
| 4,847,761 | 7/1989 | Ferriter et al. | 364/401 R |
| 4,852,019 | 7/1989 | Vinberg et al. | 364/521 |
| 4,873,623 | 10/1989 | Lane et al. | 364/188 |
| 5,093,779 | 3/1992 | Sakurai | 395/600 |
| 5,201,047 | 4/1993 | Maki et al. | 395/600 |
| 5,210,686 | 5/1993 | Jernigan | 364/403 R |
| 5,247,666 | 9/1993 | Buckwold | 395/600 |
| 5,257,365 | 10/1993 | Powers et al. | 395/600 |
| 5,260,866 | 11/1993 | Lisinski et al. | 340/49 R |
| 5,280,609 | 1/1994 | MacPhail | 395/600 |
| 5,283,892 | 2/1994 | Nakane et al. | 395/600 |
| 5,297,280 | 3/1994 | Potts, Sr. et al. | 395/600 |
| 5,301,313 | 4/1994 | Terada et al. | 395/600 |
| 5,333,315 | 7/1994 | Saether et al. | 395/600 |
| 5,359,724 | 10/1994 | Earle | 395/425 |

*Primary Examiner*—Thomas G. Black
*Assistant Examiner*—Jean R. Homere
*Attorney, Agent, or Firm*—Frishauf, Holtz, Goodman, Langer & Chick

[57] ABSTRACT

A data totalization method for a data processing apparatus having a totalization definition table for defining a name of a table record in accordance with a totalization level and defining an item to be totalized in accordance with the table name. The method includes the steps of referring to the totalization definition table and reading out data relating to the totalization item from a predetermined file, totalizing the read-out data with a table record of an associated table record name in the totalization definition table, and totalizing if a record having a higher totalization level is defined in the totalization definition table, a totalized result of the totalization record with a totalization record of the record at the higher level. If a table record name defining minus-totalization with a totalization record of the high level is defined in the totalization definition table, a totalized result of a totalization record corresponding to the record name may be minus-totalized with the totalization record of the higher level. Accordingly, even if a code system for totalization is not prepared in advance, if totalization items are defined optionally according to the totalization level, the data corresponding to the definition contents is read out from a predetermined file and the record can be totalized in the hierarchical structure corresponding to the totalization level.

6 Claims, 25 Drawing Sheets

TABLE A

| ROW NO. | TOTALIZATION LEVEL A | TOTALIZATION LEVEL B | TOTALIZATION LEVEL C | MANAGE-MENT UNIT | ITEM CODE | |
|---|---|---|---|---|---|---|
| 01 | PROFIT | | | ○ | 911 | |
| 02 | | SALES | | | | |
| 03 | | | SALES OF PRODUCTS | ○ | 111 | |
| 04 | | | SALES OF PARTS | ○ | 121 | |
| 05 | | COST- | | | | |
| 06 | | | GENERAL | ○ | 411 | |
| 07 | | | | | | |

FIG.3

FIG.7A

| SUB-CODE | PARENT CODE | END MARK | SIGN | NAME |
|---|---|---|---|---|
| B02 | A01 | 1 | | PROFIT |

STRUCTURE RECORD (2ND ROW OF TABLE A)

FIG.7B

| | A | B | C |
|---|---|---|---|
| LEVEL ROW | A01 | | |
| NAME | PROFIT | | |

LAST ITEM WORK MEMORY

FIG.7C

| | A | B | C |
|---|---|---|---|
| LEVEL ROW | A01 | B02 | |
| NAME | PROFIT | SALES | |

FIG.8A

| SUB-CODE | PARENT CODE | END MARK | SIGN | NAME |
|---|---|---|---|---|
| C03 | B02 | | | SALES |

STRUCTURE RECORD (3RD ROW OF TABLE A)

FIG.8B

| | A | B | C |
|---|---|---|---|
| LEVEL ROW | A01 | B02 | |
| NAME | PROFIT | SALES | |

← LAST ITEM WORK MEMORY

FIG.8C

| | A | B | C |
|---|---|---|---|
| LEVEL ROW | A01 | B02 | C03 |
| NAME | PROFIT | SALES | SALES OF PRODUCTS |

FIG.8D

| SUB-CODE | PARENT CODE | END MARK | SIGN | NAME |
|---|---|---|---|---|
| 111 | C03 | | | SALES OF PRODUCTS |

STRUCTURE RECORD

FIG.11A

| SUB-CODE | PARENT CODE | END MARK | SIGN | NAME |
|---|---|---|---|---|
| C06 | B05 | | | COST |

STRUCTURE RECORD (6TH ROW OF TABLE A)

FIG.11B

| | A | B | C |
|---|---|---|---|
| LEVEL ROW | A01 | B05 | |
| NAME | PROFIT | COST | |

← LAST ITEM WORK MEMORY

FIG.11C

| | A | B | C |
|---|---|---|---|
| LEVEL ROW | A01 | B05 | C06 |
| NAME | PROFIT | COST | GENERAL |

FIG.11D

| SUB-CODE | PARENT CODE | END MARK | SIGN | NAME |
|---|---|---|---|---|
| 411 | C06 | | | GENERAL |

STRUCTURE RECORD

| SUB-CODE | PARENT CODE | END MARK | SIGN | NAME |
|---|---|---|---|---|
| 911 | A01 | \| | | PROFIT |
| B02 | A01 | \| | | PROFIT |
| C03 | B02 | | | SALES |
| 111 | C03 | | | SALES OF PRODUCTS |
| C04 | B02 | | | SALES |
| 121 | C04 | | | SALES OF PARTS |
| B05 | A01 | \| | — | PROFIT |
| C06 | B05 | | | COST |
| 411 | C06 | | | GENERAL |

FIG.12

| CLASSIFICATION CODE | VALUE |
|---|---|
| 111 | 1,000 |
| 121 | 2,000 |
| 411 | 800 |
| 911 | 500 |
| | |

FIG.14A

| | | | |
|---|---|---|---|
| | | | |
| | | | |
| | | | |
| | | | |
| | | | |
| | | | |
| | | | |
| | | | |

FIG.14B

| CLASSIFICATION CODE | VALUE |
|---|---|
| 111 | 1,000 |

FIG.14C

| SUB-CODE | PARENT CODE | END MARK | SIGN | NAME |
|---|---|---|---|---|
| 111 | C03 | | | SALES OF PRODUCTS |

FIG.14D

| KEY | | NAME | VALUE |
|---|---|---|---|
| 03 | C | SALES OF PRODUCTS | 1,000 |

TO TOTALIZATION FILE

FIG.14E

| CLASSIFICATION CODE | VALUE |
|---|---|
| C03 | 1,000 |

TO DEVELOPMENT FILE

FIG.14F

CLASSIFICATION

| CODE | VALUE |
|---|---|
| 121 | 2,000 |
| 411 | 800 |
| 911 | 500 |
| C03 | 1,000 |
| | |

FIG.15A

| | | | |
|---|---|---|---|
| 03 | C | SALES OF PRODUCTS | 1,000 |
| | | | |
| | | | |
| | | | |
| | | | |
| | | | |
| | | | |
| | | | |

FIG.15B

CLASSIFICATION

| CODE | VALUE |
|---|---|
| 121 | 2,000 |

FIG.15C

| SUB-CODE | PARENT CODE | END MARK | SIGN | NAME |
|---|---|---|---|---|
| 121 | C04 | | | SALES OF PARTS |

FIG.15D

| KEY | | NAME | VALUE |
|---|---|---|---|
| 04 | C | SALES OF PARTS | 2,000 |

TO TOTALIZATION FILE

FIG.15E

CLASSIFICATION

| CODE | VALUE |
|---|---|
| C04 | 2,000 |

TO DEVELOPMENT FILE

FIG.15F

| CLASSIFICATION CODE | VALUE |
|---|---|
| 411 | 800 |
| 911 | 500 |
| C03 | 1,000 |
| C04 | 2,000 |
| | |

FIG.16A

| | | | |
|---|---|---|---|
| 03 | C | SALES OF PRODUCTS | 1,000 |
| 04 | C | SALES OF PARTS | 2,000 |
| | | | |
| | | | |
| | | | |
| | | | |
| | | | |
| | | | |

FIG.16B

| CLASSIFICATION CODE | VALUE |
|---|---|
| 411 | 800 |

FIG.16C

| SUB-CODE | PARENT CODE | END MARK | SIGN | NAME |
|---|---|---|---|---|
| 411 | C06 | | | GENERAL |

FIG.16D

| KEY | | NAME | VALUE |
|---|---|---|---|
| 06 | C | GENERAL | 800 |

→ TO TOTALIZATION FILE

FIG.16E

| CLASSIFICATION CODE | VALUE |
|---|---|
| C06 | 800 |

→ TO DEVELOPMENT FILE

FIG.16F

| CLASSIFICATION CODE | VALUE |
|---|---|
| 911 | 500 |
| C03 | 1,000 |
| C04 | 2,000 |
| C06 | 800 |
| | |

FIG.17A

| | | | |
|---|---|---|---|
| 03 | C | SALES OF PRODUCTS | 1,000 |
| 04 | C | SALES OF PARTS | 2,000 |
| 06 | C | GENERAL | 800 |
| | | | |
| | | | |
| | | | |
| | | | |
| | | | |

FIG.17B

| CLASSIFICATION CODE | VALUE |
|---|---|
| 911 | 500 |

FIG.17C

| SUB-CODE | PARENT CODE | END MARK | SIGN | NAME |
|---|---|---|---|---|
| 911 | A01 | \| | | PROFIT |

FIG.17D

| KEY | | NAME | VALUE |
|---|---|---|---|
| 01 | A | PROFIT | 500 |

TO TOTALIZATION FILE

FIG.17E

| CLASSIFICATION CODE | VALUE |
|---|---|
| C03 | 1,000 |
| C04 | 2,000 |
| C06 | 800 |
| | |
| | |

FIG.18A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 500 |
| | | | |
| | | | |
| | | | |
| | | | |

FIG.18B

| CLASSIFICATION CODE | VALUE |
|---|---|
| C03 | 1,000 |

FIG.18C

| SUB-CODE | PARENT CODE | END MARK | SIGN | NAME |
|---|---|---|---|---|
| C03 | B02 | | | SALES |

FIG.18D

| KEY | | NAME | VALUE |
|---|---|---|---|
| 02 | B | SALES | 1,000 |

TO TOTALIZATION FILE

FIG.18E

| CLASSIFICATION CODE | VALUE |
|---|---|
| B02 | 1,000 |

TO DEVELOPMENT FILE

FIG.18F

| CLASSIFICATION CODE | VALUE |
|---|---|
| C04 | 2,000 |
| C06 | 800 |
| B02 | 1,000 |
| | |
| | |

FIG.19A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 500 |
| 02 | B | SALES | 1,000 |
| | | | |
| | | | |
| | | | |

FIG.19B

| CLASSIFICATION CODE | VALUE |
|---|---|
| C04 | 2,000 |

FIG.19C

| SUB-CODE | PARENT CODE | END MARK | SIGN | NAME |
|---|---|---|---|---|
| C04 | B02 | | | SALES |

FIG.19D

| KEY | | NAME | VALUE |
|---|---|---|---|
| 02 | B | SALES | 2,000 |

FIG.19E 1,000+2,000

| KEY | | NAME | VALUE |
|---|---|---|---|
| 02 | B | SALES | 3,000 |

SUBSTITUTED IN TOTALIZATION FILE

FIG.19G

| CLASSIFICATION CODE | VALUE |
|---|---|
| B02 | 2,000 |

TO DEVELOPMENT FILE

FIG.19F

| CLASSIFICATION CODE | VALUE |
|---|---|
| C06 | 800 |
| B02 | 1,000 |
| B02 | 2,000 |
| | |
| | |

FIG.20A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 500 |
| 02 | B | SALES | 3,000 |
| | | | |
| | | | |
| | | | |

FIG.20B

| CLASSIFICATION CODE | VALUE |
|---|---|
| C06 | 800 |

FIG.20C

| SUB-CODE | PARENT CODE | END MARK | SIGN | NAME |
|---|---|---|---|---|
| C06 | B05 | | | COST |

FIG.20D

| KEY | | NAME | VALUE |
|---|---|---|---|
| 05 | B | COST | 800 |

TO TOTALIZATION FILE

FIG.20E

| CLASSIFICATION CODE | VALUE |
|---|---|
| B05 | 800 |

TO DEVELOPMENT FILE

FIG.20F

| CLASSIFICATION CODE | VALUE |
|---|---|
| B02 | 1,000 |
| B02 | 2,000 |
| B05 | 800 |
| | |
| | |

FIG.21A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 500 |
| 02 | B | SALES | 3,000 |
| 05 | B | COST | 800 |
| | | | |
| | | | |

FIG.21B

| CLASSIFICATION CODE | VALUE |
|---|---|
| B02 | 1,000 |

FIG.21C

| SUB-CODE | PARENT CODE | END MARK | SIGN | NAME |
|---|---|---|---|---|
| B02 | A01 | \| | | PROFIT |

FIG.21D

| KEY | | NAME | VALUE |
|---|---|---|---|
| 01 | A | PROFIT | 1,000 |

FIG.21E

500+1,000

| KEY | | NAME | VALUE |
|---|---|---|---|
| 01 | A | PROFIT | 1,500 |

SUBSTITUTED IN TOTALIZATION FILE

FIG.21F

| CLASSIFICATION CODE | VALUE |
|---|---|
| B02 | 2,000 |
| B05 | 800 |
| | |
| | |
| | |

FIG.22A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 1,500 |
| 02 | B | SALES | 3,000 |
| 05 | B | COST | 800 |
| | | | |
| | | | |

FIG.22B

| CLASSIFICATION CODE | VALUE |
|---|---|
| B02 | 2,000 |

FIG.22C

| SUB-CODE | PARENT CODE | END MARK | SIGN | NAME |
|---|---|---|---|---|
| B02 | A01 | \| | | PROFIT |

FIG.22D

| KEY | | NAME | VALUE |
|---|---|---|---|
| 01 | A | PROFIT | 2,000 |

FIG.22E 1,500+2,000

| KEY | | NAME | VALUE |
|---|---|---|---|
| 01 | A | PROFIT | 3,500 |

SUBSTITUTED IN TOTALIZATION FILE

FIG.22F

| CLASSIFICATION CODE | VALUE |
|---|---|
| B05 | 800 |
| | |
| | |
| | |
| | |

FIG.23A

| | | | |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 3,500 |
| 02 | B | SALES | 3,000 |
| 05 | B | COST | 800 |
| | | | |
| | | | |

FIG.23B

| CLASSIFICATION CODE | VALUE |
|---|---|
| B05 | 800 |

FIG.23C

| SUB-CODE | PARENT CODE | END MARK | SIGN | NAME |
|---|---|---|---|---|
| B05 | A01 | I | — | PROFIT |

FIG.23D

| KEY | | NAME | VALUE |
|---|---|---|---|
| 01 | A | PROFIT | 800 |

FIG.23E 3,500-800

| KEY | | NAME | VALUE |
|---|---|---|---|
| 01 | A | PROFIT | 2,700 |

SUBSTITUTED IN TOTALIZATION FILE

FIG.23F

| KEY | | NAME | VALUE |
|---|---|---|---|
| 03 | C | SALES OF PRODUCTS | 1,000 |
| 04 | C | SALES OF PARTS | 2,000 |
| 06 | C | GENERAL | 800 |
| 01 | A | PROFIT | 2,700 |
| 02 | B | SALES | 3,000 |
| 05 | B | COST | 800 |

FIG.24A

| KEY | | | |
|---|---|---|---|
| 01 | A | PROFIT | 2,700 |
| 02 | B | SALES | 3,000 |
| 03 | C | SALES OF PRODUCTS | 1,000 |
| 04 | C | SALES OF PARTS | 2,000 |
| 05 | B | COST | 800 |
| 06 | C | GENERAL | 800 |

FIG.24B

DATA TOTALIZING METHOD IN DATA PROCESSING APPARATUS

This application is a Continuation of application Ser. No. 08/219,511, filed Mar. 29, 1994, now abandoned.

BACKGROUND OF THE INVENTION

1. Field of the Invention

The present invention relates to a data totalizing method for totalizing record data from, for example, accounts files, personnel files, etc. in an office computer, a personal computer, etc.

2. Description of the Related Art

Conventionally, in an office-work processing apparatus such as an office computer or a general-purpose computer, various kinds of files such as accounts files, personnel files, salesslip files, and inventories files are stored and managed. Record structures constituting the respective files vary from file to file, and files of the same record structure (having common items of records) are stored and managed as a separate file.

In the case where records including voluntarily designated items are read out from files and classified and totalized, even if a classification code system for easy classification/totalization is initially prepared with respect to data in the items, classification will not meet the actual demand with the passage of time, resulting in inability in classification/totalization.

In the prior art, in order to solve this problem, the following technique has been widely adopted: a code conversion table for classification/totalization is provided, and classification/totalization is effected by using an optimal code system obtained by conversion using the code conversion table.

However, in the method using the code conversion table, an expert or a system engineer must produce a code system (conversion table) for classification/totalization. It requires expertise to produce a classification code system according to various business-related demands. Such a work is very difficult for a clerical person or a general user, and this work must be entrusted with a system engineer.

SUMMARY OF THE INVENTION

An object of the present invention is to provide a data totalizing method in a data processing apparatus, wherein items to be totalized are defined according to a totalizing level, without preparing in advance a totalization code system, reading out data corresponding to the definition from predetermined files and totalizing records in a hierarchical structure corresponding to the totalizing level.

In order to achieve the object, there is provided a data totalization method for a data processing apparatus having a totalization definition table for defining a name of a record in the totalization definition table in association with a totalization level and defining a totalization item in accordance with said record name, the method comprising the steps of:

referring to the totalization definition table and reading out data relating to the totalization object from a predetermined file;

totalizing the read-out data with a totalization record of an associated record name in the totalization definition table; and totalizing, if a record name at a higher level than a level of the totalization record is defined in the totalization definition table, a totalized result of the totalization record with a totalization record of the record name at said higher level.

According to the present invention, only by defining items to be totalized according to a totalizing level, without preparing in advance a totalization code system, can the data corresponding to the definition be read out from predetermined files and records can be totalized in a hierarchical structure corresponding to the totalizing level. Therefore, unlike the prior art, there is no need to entrust production of a code system with an expert such as a system engineer, and a clerical person or a general user can easily totalize data of a hierarchical structure according to a totalizing level, with very high practicality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 shows specifically definition contents on a Table A or a totalization definition table;

FIGS. 7A to 7C illustrate processes of producing operation of a structure record created in accordance with the second line of Table A;

FIGS. 8A to 8D illustrate processes of producing operation of a structure record created in accordance with the third line of Table A;

FIGS. 1OA to 10C illustrate processes of producing operation of a structure record created in accordance with the fifth line of Table A;

FIGS. 11A to 11D illustrate processes of producing operation of a structure record created in accordance with the sixth line of Table A;

FIG. 12 shows specific contents of a structure file 6 created according to Table A shown in FIG. 3;

FIGS. 14A to 14F illustrate processes of the operation in which the development totalizing processing unit 11 reads out a first record from the development file 10;

FIGS. 15A to 15F illustrate processes of the operation in which the development totalizing processing unit 11 reads out a second record from the development file 10;

FIGS. 16A to 16F illustrate processes of the operation in which the development totalizing processing unit 11 reads out a third record from the development file 10;

FIGS. 17A to 17E illustrate processes of the operation in which the development totalizing processing unit 11 reads out a fourth record from the development file 10;

FIGS. 18A to 18F illustrate processes of the operation in which the development totalizing processing unit 11 reads out a fifth record from the development file 10;

FIGS. 19A to 19G illustrate processes of the operation in which the development totalizing processing unit 11 reads out a sixth record from the development file 10;

FIGS. 20A to 20F illustrate processes of the operation in which the development totalizing processing unit 11 reads out a seventh record from the development file 10;

FIG. 21A to 21F illustrate processes of the operation in which the development totalizing processing unit 11 reads out an eighth record from the development file 10;

FIGS. 22A to 22F illustrate processes of the operation in which the development totalizing processing unit 11 reads out a ninth record from the development file 10;

FIGS. 23A to 23F illustrate processes of the operation in which the development totalizing processing unit 11 reads out a tenth record from the development file 10; and FIGS. 24A to 24B show the contents of a totalization file before and after sorting, in the case where after the development totalizing unit 11 prepares the totalization file 10, each record is sorted according to the key contents.

DETAILED DESCRIPTION OF THE PREFERRED EMBODIMENT

An embodiment of the present invention will now be described with reference to accompanying FIGS. 1 to 24B.

Figure 1:
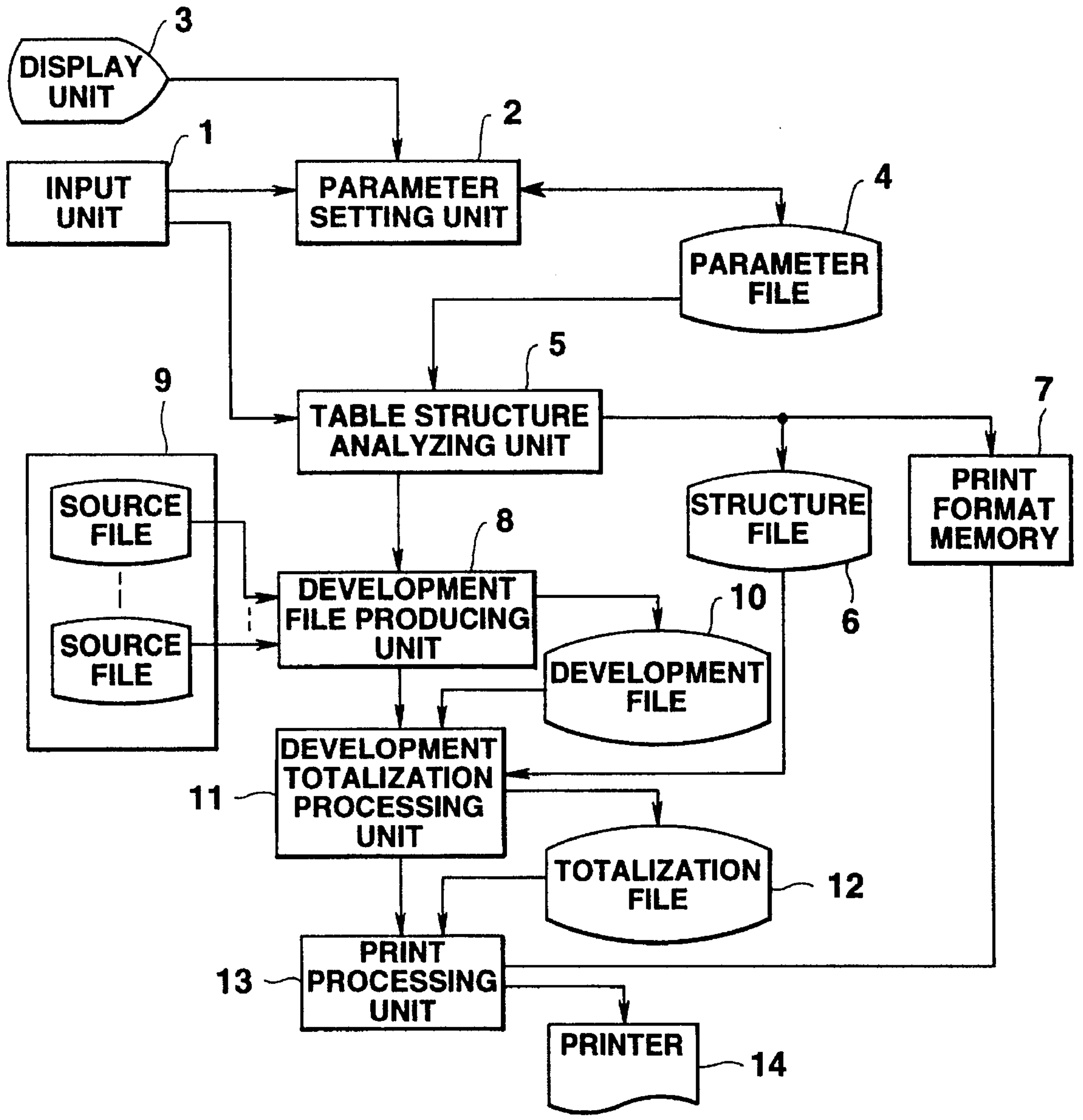
FIG. 1 is a block diagram showing a data processing apparatus according to an embodiment of the present invention.

FIG. 1 is a block diagram showing a data processing apparatus according to the embodiment. The data processing apparatus constitutes an office computer. A business clerk who has no expertise uses a totalization definition table and voluntarily designates items to be totalized in accordance with a totalization level. After doing this, a record corresponding to contents of a row in the totalization definition table is read out from a predetermined file, and the record is totalized in a hierarchical structure according to a totalization level. The totalization result is printed out as slip data.

An input unit 1 is a key input device for inputting various data items, commands, etc. Data input by the input unit 1 is processed in a parameter setting unit 2 and displayed on a display unit 3. In response to a predetermined key operation, the input unit 1 supplies an activating command to the parameter setting unit 2.

Figure 2:
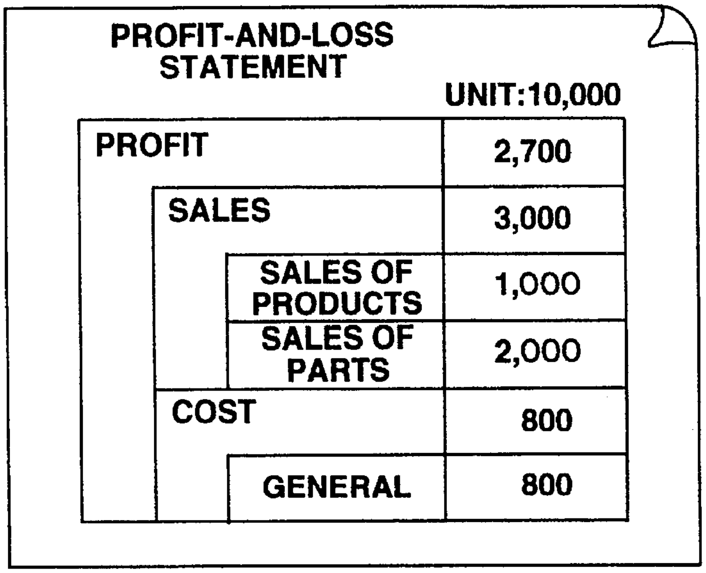
FIG. 2 shows an example of an output printed slip.

The parameter setting unit 2 operates in response to the activating command from the input unit 1 and produces, based on the data input from the input unit 1, a totalization definition table (table A in this embodiment, shown in FIG. 3) for defining names of definition table records and items to be totalized in order that a business clerk can instruct totalization of desired items. The produced table A is displayed on the display unit 3 and set in a parameter file 4. The table A will be described in detail in a more appropriate section, and so it is now briefly explained. For example, when a "profit-and-loss statement" as shown in FIG. 2 is printed out as a desired slip, table a is created as a totalization definition table based on an output image of the slip. Table A is formed as shown in FIG. 3, and it associates names of table records with item codes in accordance with a totalization level.

In the parameter file 4, a basic format(ruled line data, etc.) is fixedly stored by a maker in accordance with table A. The parameter file 4 also stores table A parameter data of various slips input voluntarily from the input unit 1 and a correspondency table for making the names of various slips input voluntarily from the input unit 1 correspond to the table A parameter data. In addition, in the parameter file 4, a format for printing a slip voluntarily designated by the input unit 1 is stored in accordance with the table A parameter data.

A table structure analyzing unit 5 operates according to an activation command input from the input unit 1 at the time of printing slips. According to the table A parameter data corresponding to the slip designated voluntarily to be output, the analyzing unit 5 analyzes a hierarchical structure corresponding to a totalizing level, and prepares a structure file 6 based on the analysis result. Although the structure file 6 will be described later in detail, it comprises various structure records representing correspondency between totalization items in table A and the associated table records, and the up-and-down relationship in hierarchical structure of totalization levels. Moreover, the table structure analyzing unit 5 reads out print formats from the parameter file 4 and sets them in a print format memory 7. Thereafter, the table structure analyzing unit 5 supplies an activation command to a development file producing unit 8.

Figure 4:
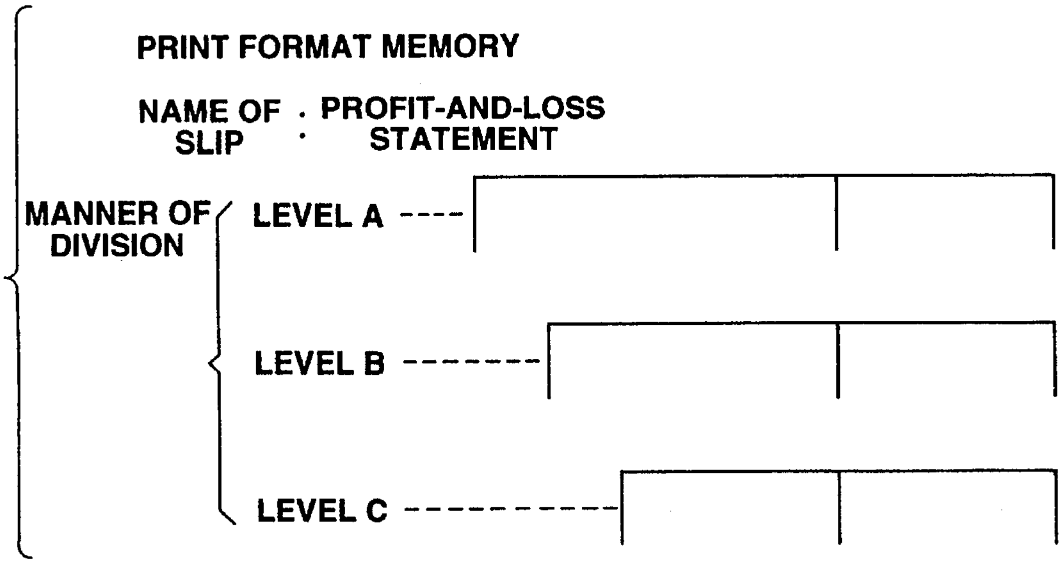
FIG. 4 shows a ruled format for dividing totalization levels set in a print format memory 7.

In addition to the voluntarily set print formats, the print format memory 7 stores, as shown in FIG. 4, a slip format (ruled-line format) corresponding to totalization levels in relation to the name of slip. The name of slip and the slip format set in the print format memory 7 are voluntarily input from the input unit 1, written in the parameter file 4, and then set by the table structure analyzing unit 5. For example, the slip format shown in FIG. 4 is a ruled-line format for "profit-and-loss statement" shown in FIG. 2. Specifically, this slip format is a ruled-line format corresponding to totalization levels A, B and C. The hierarchical structure of totalization levels is expressed by "displacement" from the left end of each ruled-line format.

The development file producing unit 8 designates a totalization item file from among various source files A to N constituting a data file 9, and writes records extracted from the totalization item file in a development file 10 as development records, one record by one record. After the development file 10 has been produced, the development file producing unit 8 delivers an activation command to a development totalization processing unit 11. Each record of the development file 10 comprises a classification code and a data value. The classification code corresponds to an item code defined on table A.

While referring to the structure file 6, the development totalization processing unit 11 produces totalization records one by one on the basis of the contents of the development file 10 and writes the totalization records in a totalization file 12. After the totalization file 12 has been produced, the development totalization processing unit 11 delivers an activation command to a print processing unit 13.

The print processing unit 13 makes a printer 14 print out the contents of the totalization file 12 in units of one record according to the print format set in the print format memory 7, along with the slip format. Thereby the slip is produced.

The detailed operation of the present embodiment will now be described.

When preparation of table A is instructed from the input unit 1 in order to obtain a desired slip, the parameter setting unit 2 operates in response. At first, when the table A is produced, the parameter setting unit 2 displays a table frame, etc. according to the basic format of table A read out from the parameter file 4. In the state in which the basic format of table A is displayed, a business clerk inputs parameter data of table A by means of the input unit 1. FIG. 3 shows an example of a display image wherein parameter data has been input in table A. In the basic format of table A, character sequences of "TOTALIZATION LEVEL A", "TOTALIZATION LEVEL B" and "TOTALIZATION LEVEL C" corresponding to three totalization levels, as well as "MANAGEMENT UNIT" and "ITEM CODE", are displayed in heading sections of column lines. The hierarchical structure of the totalization levels has a relationship of A>B>C. In the example of input data shown in FIG. 3, "PROFIT" is input as the name of a table record in row No. "01" in accordance with totalization level A, the name "SALES" is input in row No. "02" in accordance with totalization level B, and the name "COST–" is input in row No. "05", also in accordance with totalization level B. Input in accordance with the totalization level C are the name "SALES OF PRODUCTS" in row No "03", the name "SALES OF PARTS" in row No "04", and the name "GENERAL" in row No "06". In this manner, the names of table records corresponding to levels A, B and C are input in table A.

As described above, the names of table records are input in the table A in accordance with the totalization levels. Thus, if attention is paid to a certain row line, the totalization result of the record of this row line is totalized into the record of the higher level in a preceding row. Specifically, for example, the totalization result of the table record of row No. "06" is totalized into the totalization result of the higher totalization level of row No. "05". The totalization result of row No. "05" is totalized into the totalization result of the higher totalization level row No. "04". Normally, totalization into a higher level is plus-totalization. However, if a minus (–) sign is added to the name as in the name "COST–" of row No. "05", the totalization into a higher totalization level is minus-totalization.

Table A is provided with management unit areas in some of the rows. An optional row line is designated and a "o" mark is input at the corresponding location to indicate during processing (as described below) that an item code is input in this row. When the definitions in table A are analyzed in units of rows, the row with the "o" is to be analyzed, and the other rows are not analyzed. Thereby, the processing speed is increased and at the same time it is confirmed that the item data to be extracted and totalized by the business clerk is in the source file (accounts file, etc.).

In input areas under the heading of "ITEM CODE" on table A, specific item codes of items to be totalized are input. For example, item code "911" is input in an input area that is in the same row with the name "PROFIT" of totalization level A. Item code "111" is input in an input area that is in the same row with the name "SALES OF PRODUCTS" of totalization level C in row No. "03". Thereby, it is defined that a table record corresponding to item code "911" or "111" should be extracted from among totalization items of a predetermined file. For example, the item code "911" defined in the input area corresponding to the table record name "PROFIT" of totalization level A indicates totalization items of incidental profits (profits of stocks, patent royalties, etc.). A plurality of item codes can be input in the "ITEM CODE" input areas of table A in accordance with each row line. In the example of table A shown in FIG. 3, two item codes can be input, but part of the basic format of table A can be modified suitably. By extending the frame of the table, three or more item codes can be input in the same row.

If table A is produced in this manner, the parameter setting unit 2 sets the parameter data of table A in the parameter file 4.

After table A is produced as described above, a desired slip name is designated by the input unit 1 and a corresponding print command is issued. Then, the table structure analyzing unit 5 analyzes the table A parameter data in the parameter file 4 and executes a process for producing the structure file 6.

Figure 5A:
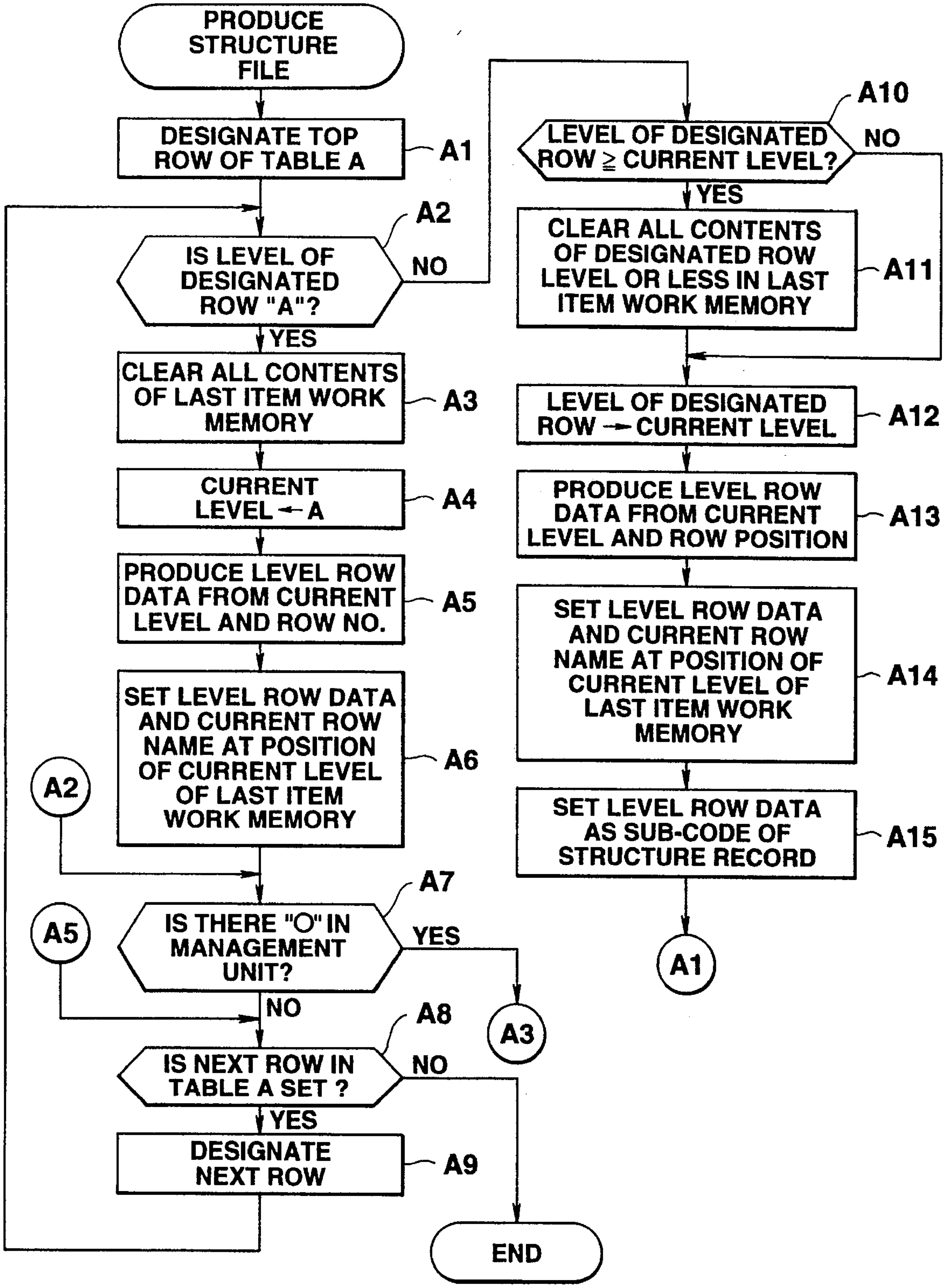
FIGS. 5A to 5C are flow charts showing a process of producing a structure file 6 by a table structure analyzing unit 5.
Figure 5B:
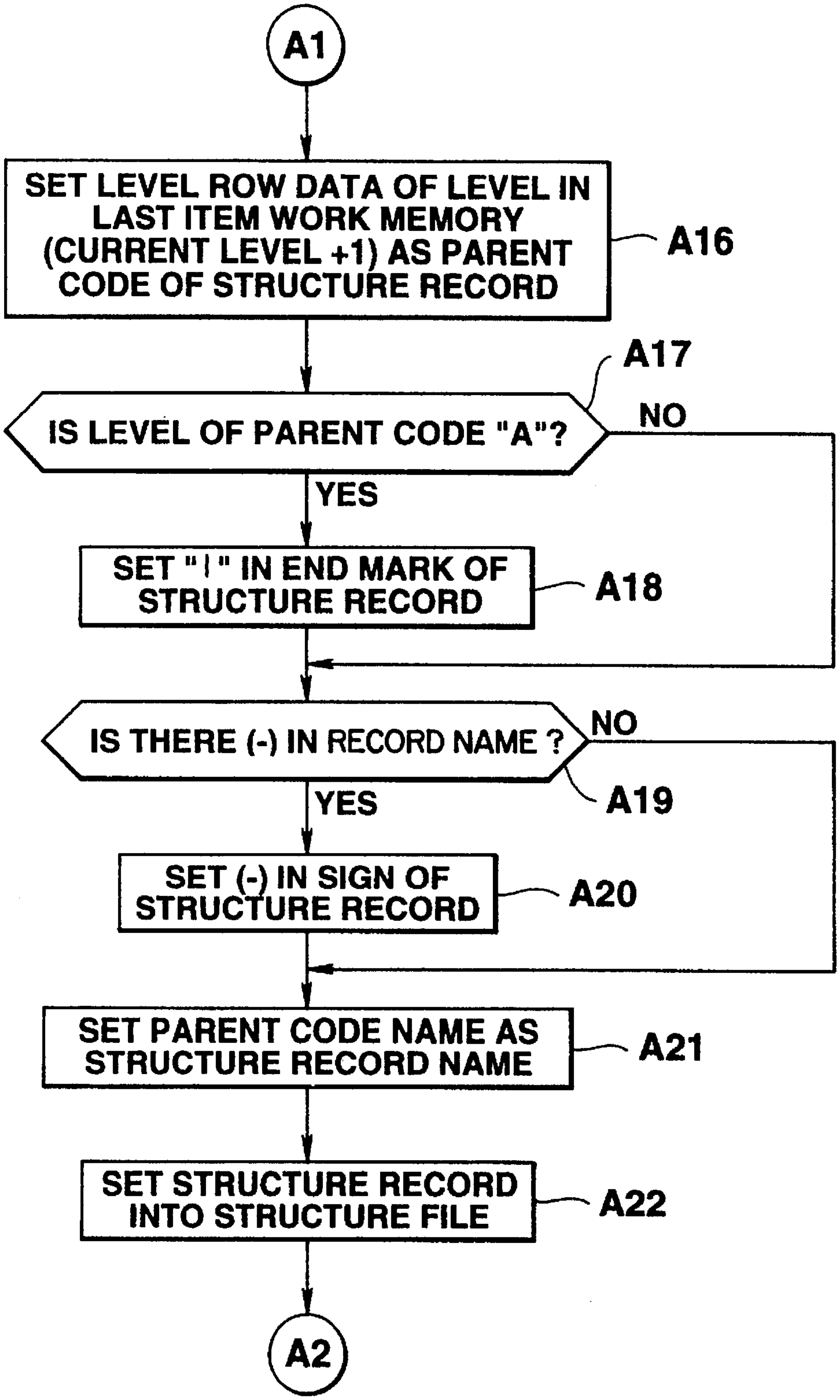
Figure 5C:
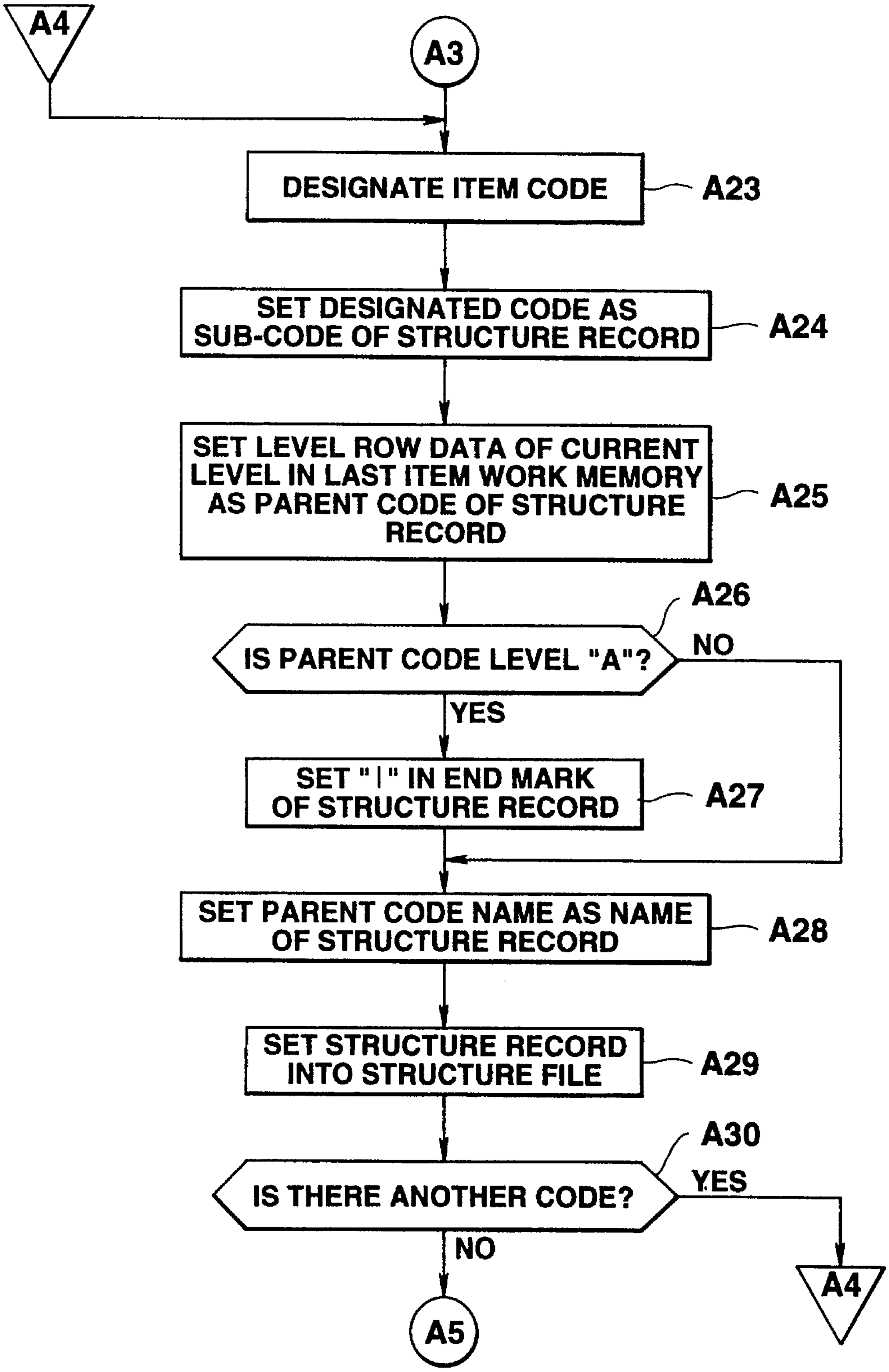
Figure 6A:
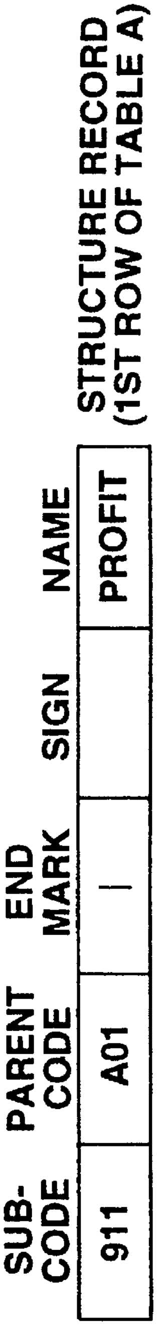
FIGS. 6A to 6C illustrate processes of producing operation of a structure record created in accordance with the first line of Table A.

FIGS. 5A to 5C are flow charts illustrating the operation for producing the structure file 6. FIGS. 6A to 11D show schematically the operation of the table structure analyzing unit 5 in this case, and illustrate the process of producing structure records in relation to the first to six rows of table A shown in FIG. 3. FIG. 12 shows specific contents of the produced structure file 6. Each record of the structure file 6 comprises a "sub-code", "parent code", "end mark", "sign", and "name", as shown in FIG. 6A. The "sub-code" and "parent code" represent a correspondency between totalization items in table A and the associated table records and an up-and-down relationship in hierarchical structure of totalization levels. The "end mark" is a flag set at "1" when totalization level A is included in the parent code. If the end mark is set at "1", it is indicated that record totalization into a higher level is not performed. A minus (–) sign is set in the "sign" column when minus totalization is defined with a minus sign attached to the table record name in table A. The "name" is a table record name of a record defined in table A.

The flow charts of FIGS. 5A to 5C will now be described specifically by referring to, for example, the case of producing structure records in relation to the first to sixth rows of table A shown in FIG. 3.

The table structure analyzing unit 5 designates a top row (first row) of table A parameters (step A1) and checks whether or not the totalization level of the designated row is a highest level A (step A2). Since the totalization level of the first row is "A", all the contents of a last item work memory (see FIG. 6B) in the table structure analyzing unit 5 are cleared to perform initial setting step A3). The totalization level A is designated as a "current level" (step A4).

Figure 6B:
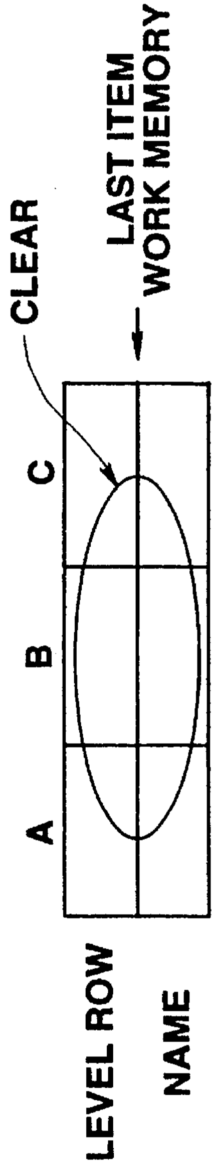
Figure 6C:
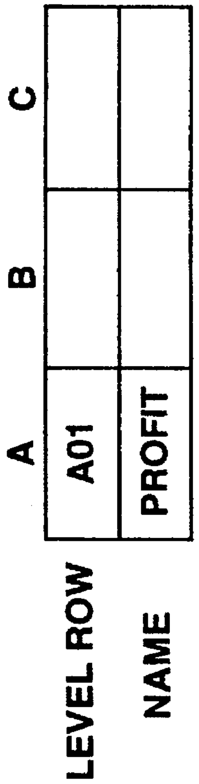

In this state, "level row" data is produced from the current level and the row number of the current row (step A5). Since the first row of table A is totalization level A and the associated row number is "01", level row data "A01" is produced by combining the current level and the row number. Then, the level row data "A01" and the table record name of the current row (record name "PROFIT" of totalization record) are set at memory locations corresponding to the current level A of the last item work memory (step A6). FIG. 6C shows the contents of the last item work memory in this case. The last item work memory is constructed to store the level row data and table record names in accordance with totalization levels A, B and C, as shown in FIG. 6B and FIG. 6C.

Subsequently, table A is checked whether a "o" mark is stored in the management unit area corresponding to the current row (step A7). Since an "o" mark is stored in the first row of table A, as shown in FIG. 3, the control routine advances to step A23 (FIG. 5C) and a first one of the item codes stored in the current row is designated. The designated item code is set as a sub-code of the structure record (step A24). In this case, since the item code is "911", the sub-code is "911" as shown in FIG. 6A. Next, the level row data "A01" of the current level in the last item work memory is set as the parent code of the structure record (step A25). It is then checked whether or not the totalization level included in the parent code is "A" (step A26). Since the totalization level A is included in the parent code, a vertical line (¦) mark is set in the end mark of the structure record under this condition (step A27). In step A28, the table record name "PROFIT" associated with this parent code is read out from the last item work memory and set as the name of this structure record (step A28). FIG. 6A shows the structure record of the first row of table A, and the sub-code is "911", parent code is "A01", end mark is "¦", and "name" is "PROFIT". This structure record is stored into the structure file 6 (step A29). In table A, the correspondence between the item code of the item to be totalized and the associated table record is shown by the combination of the sub-code "911" and parent code "A01".

Subsequently, it is checked whether another item code is stored in the current row of table A (step A30). If "YES" in step A30, the control routine returns to step A23. The next stored item code is designated, and the above operation is repeated for each item code. Since only one item code is stored in the first row of table A, only one structure record corresponding to the first row of table A is produced. If a plurality of item codes are input in one row, structure records matching with the number of item codes are produced and stored into the structure file 6.

If it is determined in step A30 that there is no other item code in the first row of table A, then the control routine advances to step A8. Attention is paid to the next row of table A, and it is checked whether or not a table record name is set in this next row. Since the name "SALES" is set in the next (i.e. second) row, the current row is updated and the next row is designated (step A9). When the second row in table A is designated thereby, the control routine goes back to step A2. In this case, the totalization level of the second row is "B" and accordingly the control routine advances to step A10 to check as to whether or not the level of the designated row is equal to or higher than the current row level. If "YES" in step A10, the contents of the last item work memory having a totalization level the same as or lower than the designated row level are cleared in the last item work memory (step A11).

Since the totalization level B of the second row is less than the current level A, the control routine goes to step A12, and the designated row level is set as the current level. Subsequently, level row data is produced from the current level and the row number (step A13). The level row data, along with the current row name, are set at a location corresponding to the current level in the last item work memory (step A14). In this case, the level row data "B02" and name "SALES" are set at locations corresponding to the current level B in the last item work memory. Thereby, the contents of the last item work memory change from those shown in FIG. 7B to those shown in FIG. 7C. Next, the level row data "B02" is set as a sub-code of the structure record, as shown in FIG. 7A (step A15). The control routine advances to step A16, and the level row data stored at the level position of "current level+1", i.e. the immediately higher preceding level, is read out from the last item work memory, and the read-out level row data is set as a parent code of the structure record. In this case, the current level is "B" and accordingly the level row data "A01" stored at the position of level A of the last item work memory becomes the parent code (see FIG. 7A). If the level included in the parent code is "A" (step A17), a vertical line (¦) is set in the end mark of the structure record (step A18). It is then checked whether or not the table record name in table A corresponding to the row number of the sub-code is accompanied with a minus sign (step A19). If the minus sign is attached, the minus sign "–" is set at the "SIGN" of the structure record (step A20). Then, the parent code name "PROFIT" is read out from the last item work memory and set as a structure record name (step A21).

If sub-code "B02", parent code "A01", end flag "¦" and name "PROFIT" have been set as mentioned above, this structure record is stored into the structure file 6. The up-and-down relationship (parent-child relationship) between the table record of record name "SALES" in row No. "02" in table A and the table record of record name "PROFIT" in the higher-level row No. "01" is indicated by the combination of the sub-code "B02" and parent code "A01".

Referring back to step A7, since the "o" mark is not stored into the management unit area of the current row, i.e. since the item code is not input to the current row, the process of producing the structure record relating to the item code is not performed and the next row is designated (step A9).

The third row is designated thereby. Since the totalization level of the third row is "C" which is lower than level B, the control routine advances to step A12 and the current level is changed to "C". Then, the structure record producing process (steps A13 to A22) will be performed. Specifically, in the state in which the contents of the last item work memory are as shown in FIG. 8B, the level row data "C03" created from the current level C and current row number and the current row name "SALES OF PRODUCTS" are set at the position of the current level C of the last item work memory (see FIG. 8C). Then, the level row data "C03" is set as a sub-code of the structure record, and the level row data "C02" of "current level+1" in the last item work memory is set as a parent code of the structure record (see FIG. 8A). In this case, since the totalization level included in the parent code is "B", the end mark is not set (step A17). Subsequently, the name "SALES" in the last item work memory stored at the position of the parent code is read out and set as a structure record name (step A21). Thereby, a structure record corresponding to the third row in table A, as shown in FIG. 8A, which comprises the sub-code "C03", parent code "B02" and name "SALES", is produced and stored into the structure file 6.

Since an "o" mark is stored in the third row, this is detected in step A7 and the structure record producing process relating to this item code is performed (steps A23 to A30). Specifically, the item code "111" of the third row is set as a sub-code of the structure record, and level row data "C03" of current level C in the last item work memory is set as a parent code of the structure record. In this case, too, since the level of the parent code is not "A", the end mark is not set. Then, the parent code name "SALES OF PRODUCTS" is set as a structure record name. Thus, as shown in FIG. 8D, a structure record comprising the sub-code "111", parent code "C03" and name "SALES OF PRODUCTS" is generated and stored into the structure file 6. Since another item code is not stored in the third row of table A, the control routine returns to step A8 at this time.

Figure 9A:
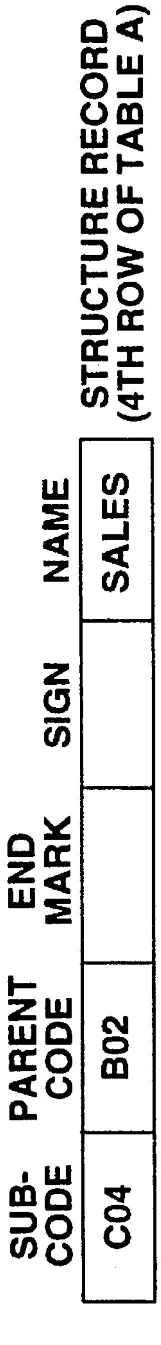
FIGS. 9A to 9D illustrate processes of producing operation of a structure record created in accordance with the fourth line of Table A.
Figure 9B:
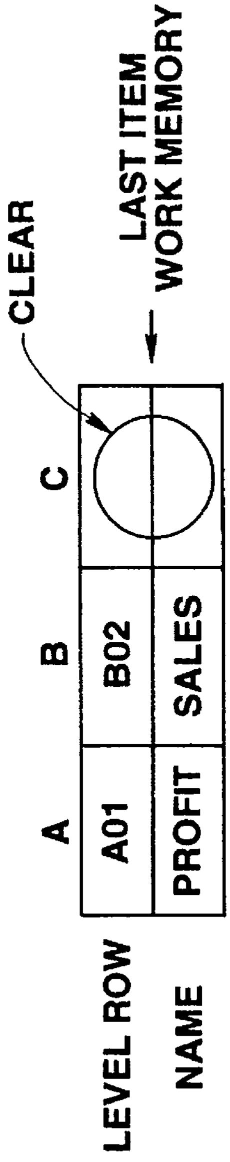
Figure 9C:
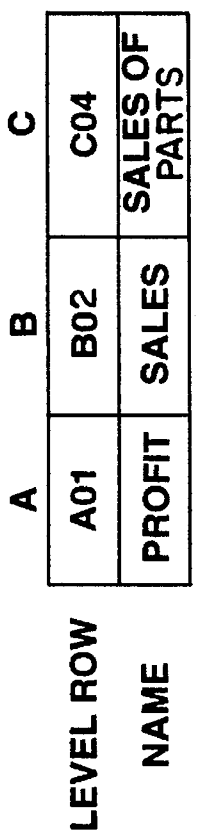
Figure 9D:
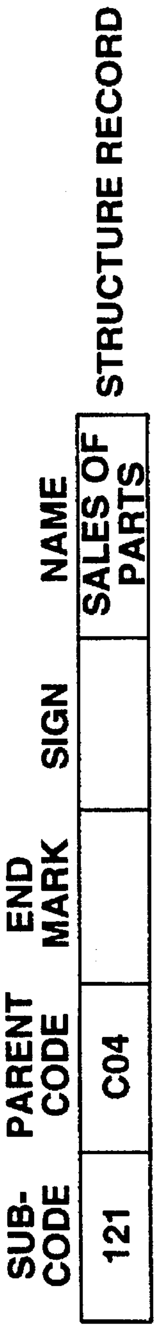

Next, the fourth row of table A is designated (step A9). Since both the totalization level and current level are "C", this is detected in step A10 and the control routine advances to step A11. In the last item work memory, the contents of the last item work memory having a totalization level the same as or lower than the designated row level, i.e. all contents of level C in this case, are cleared (see FIG. 9B). In this state, level row data "C04" is generated and, as shown in FIG. 9C, this level row data as well as current row name "SALES OF PARTS" are set at the position of level C of the last item work memory. The level row data "C04" is set as a sub-code of the structure record, and level row data "B02" of "current level+1" in the last item work memory is set as a parent code of the structure record. Furthermore, parent code name "SALES" is set as a structure record name. Thereby, a structure record as shown in FIG. 9A is produced and written out onto the structure file 6.

On the other hand, since the "o" mark is added to the management unit in the fourth row of table A, a structure record is produced subsequently. A fourth-row item code "121" is a sub-code (steps A23 and A24), current-level row data "C04" in the last item work memory is a parent code (step A25), and parent code name "SALES OF PARTS" is a structure record name (step A28) (see FIG. 9D).

Figure 10A:
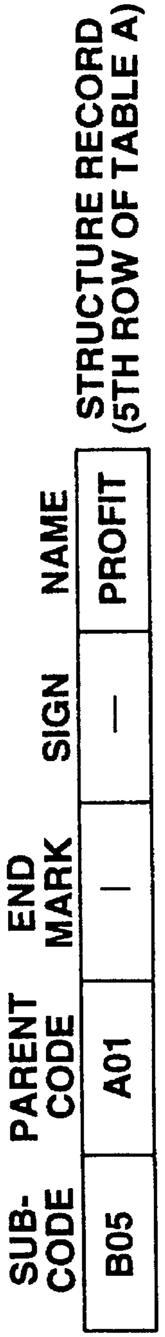
Figure 10B:
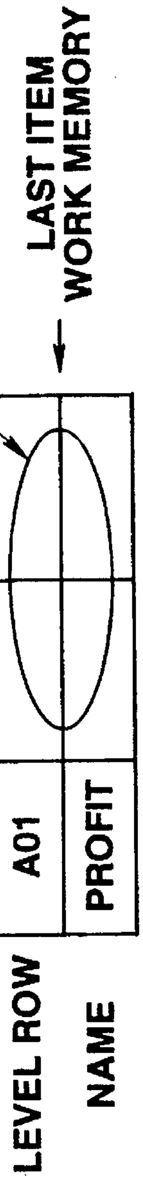
Figure 10C:
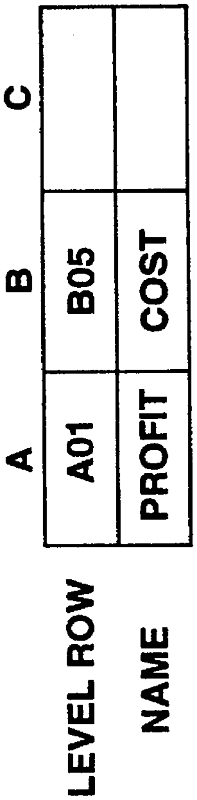

Subsequently, the fifth row of table A is designated. The fifth-row totalization level is "B" and the current level is "C". Thus, as shown in FIG. 10B, in the last item work memory, the contents of a level at the designated row level B or lower are cleared (step A11). In this state, level row data "B05" is generated (step A13) and, as shown in FIG. 10C, this level row data and name "COST", obtained by deleting the minus sign from the current row name "COST–", are set at the position of level B of the last item work memory (step A14). A record comprising the level row data "B05" as a sub-code, level row data "A01" of "current level+1" in the last item work memory as a parent code and parent code name "PROFIT" as a structure record name (see FIG. 10A) is produced and stored into the structure file 6. Since the "o" mark is not stored into the management unit in the fifth row of table A, a structure record relating to this item code is not produced.

Then, the sixth row of table A is designated. In this case, the sixth-row totalization level is "C" and the current level is "B". Thus, the process for clearing the contents of the last item work memory (step A11) is not performed, and the contents of the last item work memory are in the state as shown in FIG. 11B. In this state, level row data "C06" is produced and, as shown in FIG. 11C, this level row data and the current row name "GENERAL" are set at the position of level C of the last item work memory. A record comprising the level row data "C06" as a sub-code, level row data "B05" of "current level+1" in the last item work memory as a parent code and parent code name "COST" as a structure record name (see FIG. 11A) is produced and stored into the structure file 6. Since the "o" mark is stored into the management unit in the sixth row of table A, a structure record relating to the item code is produced. In this case, as shown in FIG. 11D, the sixth-row item code "411" is a sub-code, current level row data "C06" in the last item work memory is a parent code, and parent code name "GENERAL" is a structure record name.

Thereafter, the seventh row of table A is designated, and absence of data is detected in step A8 and the structure file producing process is completed at this time. The structure file 6 produced by analyzing table A of FIG. 3 is shown in FIG. 12. Specifically, the structure file 6 comprises nine structure records. The first record corresponds to the first row of table A, the second record to the second row of table A, the third and fourth records to the third row of table A, the fifth and sixth records to the fourth row of table A, the seventh record to the fifth row of table A, and the eighth and ninth records to the sixth row of table A. When the structure file 6 has been produced, the table structure analyzing unit 5 delivers an activation command to the development file producing unit 8.

The development file producing unit 8 designates a totalization item file from among various source files A to N constituting the data file 9, or writes records extracted from the totalization item file into the development file 10 as development records one by one. Each record of the development file 10 comprises a classification code and a data value. After the development file 10 has been prepared, the development file producing unit 8 delivers an activation command to the development totalization processing unit 11.

The development totalization processing unit 11 prepares totalization records one by one on the basis of the contents of the development file 10, by referring to the structure file 6, and writes the prepared totalization records into the totalization file 12. In this case, the development totalization processing unit 11 generates, according to a part-development method, the totalization file 12 on the basis of the contents of the development file 10 and the contents of the structure file 6.

Figure 13:
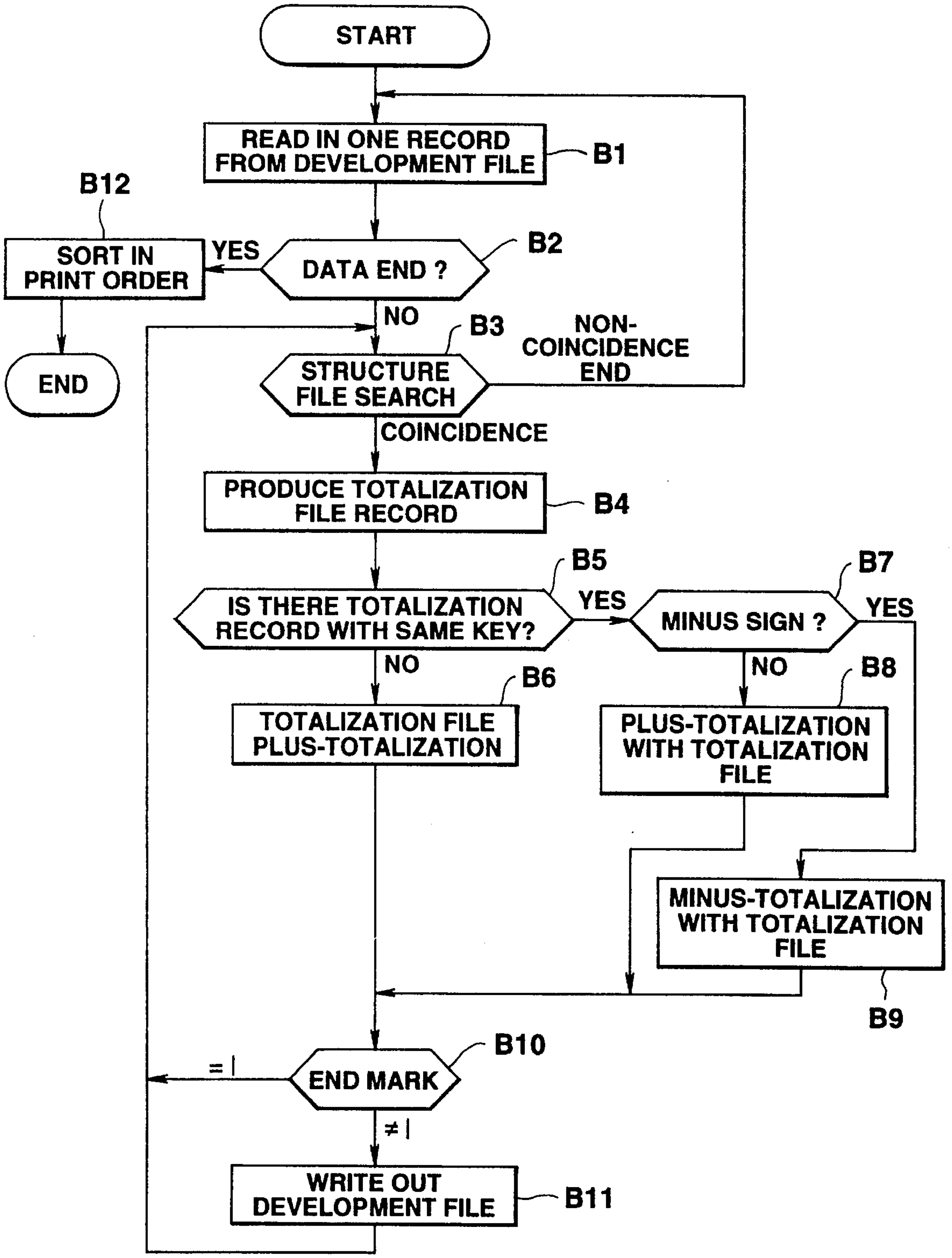
FIG. 13 is a flow chart illustrating the operation in which a development totalizing processing unit 11 prepares a totalization file 12 from the contents of a structure file 6 and a development file 10.

FIG. 13 is a flow chart illustrating the operation of the development totalization processing unit 11, and FIGS. 14A to 23F illustrate specifically the operations of the development totalization processing unit 11.

Suppose that a totalization record will be produced on the basis of the contents of the structure file 6 shown in FIG. 12 and the contents of the development file 10 shown in FIG. 14A.

The development totalization processing unit 11 reads in data from the top record of the development file 10 (step B1). In step B2, it is checked whether data is finished, i.e. whether all records have been read out from the development file 10. In the next step B3, the contents of the structure file 6 are searched to find, from the structure file 6, a sub-code corresponding to the classification code of the development record. FIGS. 14A to 14F illustrate processes of the operation in the case where data from the top, or first, record has been read from the development file 10. In the development file 10 shown in FIG. 14A, the first development record comprises classification code "111" and data value "1,000". Since the structure record having a sub-code identical to this classification code is the fourth record in the structure file 6 shown in FIG. 12, coincidence is detected in step B3 and the control routine goes to step B4 to generate records of the totalization file 12 (see FIG. 14B). In the specific example, FIG. 14C indicates a first development record and FIG. indicates a coincidence-detected structure record. At first, the development totalization processing unit 11 reads out parent code "C03" corresponding to the sub-code in this structure record and divides this parent code into both components of a "KEY", namely a row number of table A (i.e. "03") and a totalization level (i.e. "C"). The row No. "03" is set at the top row, i.e. the first totalization record, of the totalization file 12, and totalization level "C" is set to follow that. The name in this structure record is set in the next input area of the totalization record. Subsequently, data value "1,000" of the development record is set in the next input area of the totalization record. FIG. 14E shows a totalization record thus formed. This totalization record is defined in row No. "03" of table A, which has record name "SALES OF PRODUCTS" and totalization level "C". The data “1,000” corresponding to totalization item code “111” defined on table A according to this table record name is totalized, as follows.

In the next step B5, it is determined whether a record having the same key as the currently produced totalization record has already been stored. If there is no totalization record having the same key, the produced totalization record is stored into the totalization file 12 (step B6). If a totalization record having the same key is stored in the totalization file 12, the control routine goes to step B7 to check whether or not the minus sign is set by referring to “SIGN” in the structure record. If there is no minus sign, the already existing totalization record having the same key and the currently produced totalization record are plus-totalized into a single record and the single record is written in the totalization file 12 (step B8). If there is a minus sign, the already existing totalization record having the same key and the currently produced totalization record are minus-totalized into a single record and the single record is written in the totalization file 12 (step B9). As shown in FIG. 14B, no totalization record is yet stored in the totalization file 12. In step B5, it is detected that there is no totalization record having the same key.

In step B10, it is determined whether end mark “!” is set in the structure record. The end mark in the structure record is “!” when the totalization level included in the parent code is “A”, as described above. When the end mark is “!”, the control routine returns to step B3. If the end mark is not “!”, a new development record is produced and written into the development file 10 (step B11). In other words, if a record of a higher level than the currently produced totalization record is defined in table A, a new development record is produced and written into the development file 10 in order to totalize the totalization result of the currently produced totalization record with the totalization record of the record in the higher level.

Since the end mark “!” is not set in the structure record, a new record as shown in FIG. 14F is produced and written into the development file 10. Specifically, parent code “C03” in the structure record is set at the classification code, and data value “1,000” in the development record is set after the classification code. The thus formed new development record is written into the development file 10. Thereafter, the control routine returns to step B3, and the contents of the structure file 6 are searched. The above operation is repeated until the structure record having a sub-code identical to classification code “111” in the development record is not detected. As a result, if absence of the related record is detected in step B3, non-coincidence is confirmed and the control routine goes back to step B1 to read out the next record from the development file 10.

FIGS. 15A to 15E illustrate processes of the operation in the case of reading in the next record from the development file 10. FIG. 15A shows the contents of the development file 10 at this point of time. Records set under a thick line are development records newly produced, as in the case of FIG. 14F. FIG. 15B shows the contents of the totalization file 12 at this time point, in which the totalization record generated in the case of FIG. 14E is written at the top of the totalization file 12. Furthermore, FIG. 15C shows a record currently read out from the development file 10, and FIG. 15D shows a structure record having a sub-code identical to the classification key of this development record. The development totalization processing unit 11 produces a totalization record, as shown in FIG. 15E, from this development record and the structure record. This totalization record is a totalization record of totalization level C, having record name “SALES OF PARTS” defined in row No. “04” in table A. In this totalization record, data “2,000” corresponding to totalization item code “121” defined in table A in accordance with this record name is totalized. In this case, too, since no totalization record having the same key is present in the totalization file 12, additional totalization with the totalization file 12 is performed (step B6). In addition, since the end mark is not set in this structure record, as in the above case, a new development record (see FIG. 15F) is produced and written into the development file 10 (step B11). Thereafter, if non-coincidence is detected in step B3, the next record is read in from the development file 10 (step B1).

Similarly, FIGS. 16A to 16F illustrate processes of the operation in the case of reading in the next record from the development file 10. In this case, a totalization record as shown in FIG. 16E is produced from a record shown in FIG. 16C read out from the development file 10 and the associated structure record shown in FIG. 16D. This totalization record is a totalization record of totalization level C, having record name “GENERAL” defined in row No. “06” in table A. In this totalization record, data “800” corresponding to totalization item code “411” defined in table A in accordance with this record name is totalized, and additional totalization with the totalization file 12 is performed. In this case, too, a new development record, as shown in FIG. 16F, is produced in order to totalize the totalization result of the currently produced totalization record with the totalization record of the record in the higher level.

Furthermore, FIGS. 17A to 17E illustrate processes of the operation in the case of reading in the next record from the development file 10. In this case, too, a totalization record as shown in FIG. 17E is produced from a record shown in FIG. 17C read out from the development file 10 and the associated structure record shown in FIG. 17D. This totalization record is a totalization record of totalization level A, having record name “PROFIT” defined in row No. “01” in table A. In this totalization record, data “500” corresponding to totalization item code “911” defined in table A in accordance with this table record is totalized, and additional totalization with the totalization file 12 is performed.

If totalization item code “911” is defined in table A in accordance with table record name “PROFIT” of totalization level A, as described above, the totalization record based on that totalization item code is also produced. If the item code “911” refers to an incidental profit item, the produced record is the totalization record of the incidental profit. In this case, since the totalization level is “A” and accordingly the end mark “!” is set in the structure record, a new development record is not produced.

If the contents of the development file 10 shown in FIG. 14A are successively read out in units of one record to produce the totalization records, as mentioned above, totalization records as shown in FIG. 18B are written in the totalization file 12. The records in the totalization file 12 are totalization records obtained by totalizing data corresponding to totalization item codes “111”, “121”, “411” and “911” defined in table A. Thereby, all totalization records corresponding to the totalization items are prepared.

Then, a process for totalizing the totalized result of each totalization record with totalization records of a higher level is executed. At first, the totalization records of totalization level B are produced, and thereafter the totalization records of totalization level A are produced. FIGS. 18A to 20F relate to production of totalization records of totalization level B, and FIGS. 21A to 23F relate to production of totalization records of totalization level A.

FIGS. 18A to 18F illustrate processes of the operation in the case where newly produced development records have been read in with reference to the case of FIG. 14F. As is shown in FIG. 18C, a classification code of the development record is "C03", and the parent code in the structure record having the identical sub-code is "B02" as shown in FIG. 18D. Accordingly, a totalization record as shown in FIG. 18E is produced from this development record and structure record. This totalization record is a totalization record having row No. "02" with higher level than the totalization record of row No. "03" of table A and having record name "SALES". In this totalization record, the data value of the development record shown in FIG. 18C, i.e. totalization result "1,000" of row No. "02", is totalized. In this case, since no totalization record having the same key has been present in the totalization file 12, this totalization record is additionally totalized in the totalization file 12. In this case, too, for totalization with totalization records of a higher level, a new development record as shown in FIG. 18F is produced and written into the development file 10.

FIGS. 19A to 19G illustrate processes of the operation in the case where newly produced development records have been stored with reference to the case of FIG. 15F. In this case, too, as shown in FIG. 19C, a parent code of the structure record having a sub-code identical to classification code "C04" of the development record is "B02". Accordingly, a totalization record as shown in FIG. 19E is produced from this development record and structure record. This totalization record is a totalization record having row No. "02" with a higher totalization level than the totalization record of row No. "04" of table A and having record name "SALES". In this totalization record, the data value of the development record shown in FIG. 19C (totalization result "2,000" of row No. "04") is totalized. Since the totalization record having the same key, which was produced in the case of FIG. 18E, is already present in the totalization file 12, the currently produced totalization record and the totalization record having the same key in the totalization file 12 are combined into a single record and written in the totalization file 12. Specifically, the data value of the currently produced totalization record and the data value of the already produced totalization record are totalized. In this case, however, the minus sign is not set at "SIGN" in the structure record, as shown in FIG. 19D, and therefore plus-totalization is executed. A new totalization record (with the same key and name) having a data value "1,000+2,000=3,000" is written in the fifth record in the totalization file 12, i.e. in the position where the totalization record having the same key was stored, and the content of the record is changed to the new totalization record (see FIG. 19G). Thereby, the totalization record newly written in the totalization file 12 becomes the record in which the contents of the totalization record corresponding to row Nos. "03" and "04" in table A at the lower level (i.e. the record contents of the first record and second record in FIG. 19B) have been plus-totalized. In this case, too, a new development record as shown in FIG. 19F is produced. This development record has a classification code identical to classification code "B02" of the development record produced in the case of FIG. 18F, but data values are different.

FIGS. 20A to 20F illustrate processes of the operation in the case where newly produced development records have been read in with reference to the case of FIG. 16F. A totalization record as shown in FIG. 20E is produced from the development record shown in FIG. 20C and the structure record shown in FIG. 20D. This totalization record is a totalization record having row No. "05" of level B higher than the level of the totalization record of row No. "06" of table A and having record name "COST". In this totalization record, the data value of the development record shown in FIG. 20C, i.e. totalization result "800" of row No "06", is totalized In this case since no totalization record having the same key has been present in the totalization file 12, the additional totalization to the totalization file 12 is executed. Furthermore, a new development record as shown in FIG. 20F is produced.

As described above, the development records newly produced from the development file 10 in the case of FIGS. 14F, 15F and 16F are successively read out and the totalization records of totalization level B are produced accordingly. Furthermore, the development records newly produced as shown in FIGS. 18F, 19F and 20F are successively read out from the development file 10 to produce totalization records (FIGS. 21A to 23F). In this case, the process for producing the totalization records of the highest level A is executed, the totalization to the upper level is not required and new development records are not produced.

FIGS. 21A to 21F illustrate processes of the operation in the case where development records newly produced in FIG. 18F are read in. The totalization record produced at this time has row No. "01" in table A, totalization level A, and record name "PROFIT", and the data value thereof is "1,000". In this case, a totalization record having the same key as this totalization record is the fourth record in the totalization file 12 and no minus sign is added in the structure record. Thus, the data value of the currently produced totalization record and the data value of the fourth totalization record in the totalization file 12 are plus-totalized, and the resultant value "500+1,000=1,500" is written over the contents of the fourth record in the totalization file 12.

FIGS. 22A to 22F illustrate processes of the operation in the case where development records newly produced in FIG. 19F are read in. The totalization record produced in this case is a totalization record of totalization level A, as in the case of FIG. 21F, and the data value is "2,000". This totalization record, too, is totalized with the fourth totalization record in the totalization file 12 having the same key into a single totalization record.

Lastly, FIGS. 23A to 23F illustrate processes of the operation in the case where development records newly produced in FIG. 20F are read in. The totalization record produced in this case is a totalization record of totalization level A, as in the case of FIG. 21F, and the data value is "800". In this case, since the minus sign is set in the structure record, the currently produced totalization record and the totalization record having the same key in the fourth record in the totalization file 12 are subjected to minus-totalization, and the resultant value "3,500–800=2,700" is substituted for the contents of the fourth record in the totalization file 12.

The value "2,700" of the thus produced totalization record of totalization level A is obtained such that the totalization record value "500" of the corresponding item code "911" is plus-totalized with the record value "1,000" of "SALES OF PRODUCTS" and record value "2,000" of "SALES OF PARTS" in the lower level, and the totalized result and the record value "800" of "GENERAL" are subjected to minus totalization. Accordingly, the incidental profit is accounted in the record value of totalization level A.

If all records in the development file 10 are read out, the "data end" is detected in step B2 in FIG. 13 and the control routine goes to step B12. The records of the totalization file 12 are sorted in an increasing order according to the KEY contents (i.e. row numbers). FIGS. 24A and 24B show the contents of the totalization file 12 in this case. FIG. 24A shows the contents of the totalization file 12 before sorting, and FIG. 24B shows those after sorting. The sorted records in the totalization file 12 are thus arranged according to a print order at the time of outputting slips. Thereafter, the development totalization unit 11 activates the print processing unit 13.

The print processing unit 13 fetches the contents of the print format memory 7 and causes the printer 14 to print out the contents of the totalization file 12 along with the slip format according to the print format stored in the memory 7. Thus, a slip is produced. In this case, the print processing unit 13 reads out the totalization records one by one from the top of the totalization file 12, discriminates the totalization level included in the totalization record, reads out the corresponding division ruled-line format (see FIG. 4) from the print format memory 7, and has the ruled-line format and names and data values in the totalization record printed out in units of one record. Thus, the slip (profit-and-loss statement) as shown in FIG. 2 is printed out, and the contents of the totalization file 12 shown in FIG. 24B along with the hierarchical format according to the totalization level are printed out.

As has been described above, in the present embodiment, the business clerk, etc. defines table record names of totalization records in table A or the totalization definition table, in accordance with the totalization level, in order to obtain a desired slip. In addition, the totalization item codes are defined in relation to the table record names. With reference to the table A, the data corresponding to the totalization item code is read out from a predetermined file. The read-out data is totalized in accordance with the corresponding table record name in table A. Moreover, if a record of a level higher than the level of this table record is defined in table A, the totalization result of this table record is totalized with the totalization record of the table record at the higher level. On the other hand, if a minus (–) sign is added to the table record name in order to define the minus totalization with the higher-level totalization record, the totalized result of the totalization record of this record is minus-totalized with the upper-level totalization record. If the incidental profits, e.g. profit of stocks, patent royalties, are defined as a totalization item code in accordance with record name "PROFIT" of row No. "01" in table A, the incidental profits are accounted for in the totalization record of "PROFIT".

The table structure analyzing unit 5 analyzes table A parameters and prepares the structure file 6. By referring to the structure file 6, the development totalization processing unit 11 prepares the totalization file 12. Thus, the development totalization processing unit 11 can prepare the totalization file 12 efficiently. Specifically, the structure file 6 contains all data necessary for generating totalization records, e.g. information relating to the correspondence between totalization item codes and totalization records of associated table record names, and the up-and-down relationship between table record names and higher-level totalization records. Thus, on the basis of the contents of the structure file 6, the development totalization processing unit 11 can easily produce totalization records. The development totalization processing unit 11 can produce the totalization file 12 more efficiently than by referring to the parameter file 4 directly.

The development totalization processing unit 11 produces the totalization file 12 and thereafter sorts the records according to the row numbers thereof. Thus, the order of arrangement of records in the totalization file 12 corresponds to the order of arrangement of table record names defined in table A. In addition, the print processing unit 13 reads out the contents of the totalization file 12 from the top thereof in units of one record, checks the totalization level included in the totalization records, and prints out the names of totalization records and data values along with the ruled-line format predetermined in accordance with the totalization level. The printed result of the formed slip corresponds to the definition contents of table A, and the slip having the hierarchical structure corresponding to the totalization level can be obtained.

As described above, in the present embodiment, the business clerk who has no expertise defines voluntarily the table records and totalization item codes at each totalization level by using table A. Only by doing so, the data corresponding to an item in the table definition is read out from a predetermined file, and the item is totalized in the hierarchical structure corresponding to the totalization level. The totalization record is printed out in the order of arrangement in table A, along with the ruled-line format corresponding to the totalization level. Therefore, anyone can obtain a desired slip easily.

In the above embodiment, an optional record name is directly input in table A from the input unit 1 for each totalization level. If the names of records to be used are predetermined, it is possible to store the names of records to be used in the table, display the table contents on a window screen at the time of inputting record names, and input the record names by choosing desired record names. The record name is not limited to a name, but it may be a code.

In the above embodiment, the totalization item codes are input in table A. However, names other than codes may be input, and totalization items may be indicated by designating an intersection point on the matrix of table A.

In table A, the minus sign indicating minus-totalization is added to the table record name. However, the information indicating the minus totalization may be input at any position in table A.

In the description of the above embodiment, the incidental profit is defined in table A as a totalization item in accordance with the table record name "PROFIT" of totalization level A. For example, if non-sectional sales, etc. are defined in accordance with record name "SALES" of totalization level B in table A, the non-sectional sales, etc. may be accounted in this totalization record.

Needless to say, the record structure of the structure file 6 is not limited to the above embodiment if the hierarchical structure, etc. defined in table A are developed. Moreover, the shape of the ruled-line format is not limited if totalization levels can be discriminated.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A record totalization method for a data processing apparatus comprising the steps of:

arbitrarily preparing a totalization definition table representing a definition of totalization records defined by an arbitrary record name, a definition of totalization levels for providing an indication to totalize the defined totalization records, and a definition of data in records as a totalization object of each totalization record;

analyzing the data in the records as the totalization object and a relationship between the totalizations among the records in accordance with the totalization levels, on the basis of the prepared totalization definition table;

extracting records having a data corresponding to the totalization object from a predetermined file, on the basis of the analysis;

totalizing said extracted records having the data corresponding to the totalization objects, as the totalization record defined by said record name, on the basis of said analysis, and, if totalization records at a higher level than a level of said totalization record exist, further totalizing the totalization records, as a totalization record of a record name at said higher level.

2. The record totalization method according to claim 1, wherein, in the totalizing step, if a record name indicating minus-totalization to a totalization record of a higher level is defined in said totalization definition table, the totalization record is minus-totalized to said totalization record of the higher level.

3. The record totalization method according to claim 1, wherein the analyzing step includes a step of generating a key including the data in the record as a totalization object and the totalization level, the extracting step includes a step of extracting the records on the basis of the key including the data in the record as a totalization object, and the totalizing step includes a step of totalizing the records on the basis of the key including the totalization level.

4. A record totalization apparatus for a data processing apparatus, comprising:

means for arbitrarily preparing and then storing a totalization definition table representing a definition of totalization records defined by an arbitrary record name, a definition of totalization levels for providing an indication to totalize the defined totalization records, and a definition of data in records as a totalization object of each totalization record;

means for analyzing the data in the records as the totalization object and a relationship between the totalizations among the records in accordance with the totalization levels, on the basis of the prepared totalization definition table;

means for extracting records having data corresponding to the totalization object from a predetermined file, on the basis of analysis by said means for analyzing; and totalizing means for:

totalizing said extracted records having the data corresponding to the totalization object, as the totalization record defined by said record name, on the basis of said analysis, and if totalization records at a higher level than a level of said totalization record exist, further totalizing, the totalization records, as a totalization record of a record name at said higher level.

5. The record totalization apparatus according to claim 4, wherein, if a record name indicating minus-totalization to a totalization record of a higher level is defined in said totalization definition table, the totalization record is minus-totalized to said totalization record of the higher level.

6. A totalization method for a data processing apparatus comprising the steps of:

preparing a totalization definition table constituted by columns in which a plurality of totalization levels and items to be totalized are assigned, and a plurality of row numbers, by (i) arbitrarily assigning a name indicating a record to a position defined by a row number and a column in which a totalization level is assigned, and (ii) arbitrarily assigning an item to be totalized to a position defined by a column in which the item is assigned and a row in which the name is assigned;

analyzing contents of the prepared totalization definition table, by obtaining a hierarchy relationship of totalization from columns of a totalization level, and obtaining an item to be totalized as a part of records, from a column to which the item is assigned, thus identifying items to be totalized for the name of each record, and a record of a hierarchy to which the totalization is recorded;

reading out from a predetermined file data corresponding to the identified items to be totalized;

totalizing said data respectively corresponding to the items to be totalized, on the basis of said analysis, by processing said plurality of records sequentially, and, if a record at a higher totalization level than a level of a currently processed record exists, further processing the current record, as a totalization of a record at said higher level.

* * * * *